US012586556B2

(12) United States Patent
Su et al.

(10) Patent No.: US 12,586,556 B2
(45) Date of Patent: Mar. 24, 2026

(54) ANGLE INDEPENDENT ACOUSTIC STRUCTURES FOR BROADBAND SOUND ABSORPTION AND SOUND TRANSMISSION LOSS

(71) Applicants: Toyota Motor Engineering & Manufacturing North America, Inc., Plano, TX (US); Toyota Jidosha Kabushiki Kaisha, Toyota (JP)

(72) Inventors: Xiaoshi Su, Ann Arbor, MI (US); Debasish Banerjee, Ann Arbor, MI (US); Tomohiro Miwa, Toyota (JP); Miki Nakahara, Toyota (JP); Reimi Emoto, Toyota (JP); Mizuki Sakamoto, Toyota (JP); Toyohiro Sone, Handa (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 236 days.

(21) Appl. No.: 18/470,535

(22) Filed: Sep. 20, 2023

(65) Prior Publication Data

US 2025/0095622 A1 Mar. 20, 2025

(51) Int. Cl.
*G10K 11/172* (2006.01)

(52) U.S. Cl.
CPC .................................. *G10K 11/172* (2013.01)

(58) Field of Classification Search
CPC .................................................... G10K 11/172
See application file for complete search history.

(56) References Cited

U.S. PATENT DOCUMENTS

| | | | | |
|---|---|---|---|---|
| 2,715,449 A * | 8/1955 | Smith | F21S 8/06 | 362/253 |
| 5,444,198 A * | 8/1995 | Gallas | E04B 1/8209 | 181/295 |
| 7,178,630 B1 * | 2/2007 | Perdue | E04B 1/8209 | 181/290 |
| 8,955,643 B2 * | 2/2015 | Liu | F04D 29/441 | 60/725 |
| 9,343,059 B2 * | 5/2016 | Wilson | G10K 11/172 | |
| 10,767,365 B1 * | 9/2020 | Noxon, IV | E04B 1/8404 | |

(Continued)

FOREIGN PATENT DOCUMENTS

CN 106205590 A 12/2016

OTHER PUBLICATIONS

Wu et al. "Multiband omnidirectional ventilated acoustic barriers based on localized acoustic rainbow trapping." Physical Review Applied 15.5 (2021): 054033.

(Continued)

*Primary Examiner* — Forrest M Phillips
(74) *Attorney, Agent, or Firm* — Christopher G. Darrow; Darrow Mustafa PC

(57) ABSTRACT

An acoustic structure includes at least one acoustic scatterer that is angle independent and has multiple resonant frequencies. Each acoustic scatterer contains at least one repeated cell. Each cell contains at least two distinct resonant channels capable of absorbing sound and improving sound transmission loss at distinct frequencies. Each resonant channel is identical to at least one other channel within the acoustic scatterer.

16 Claims, 10 Drawing Sheets

(56) References Cited

U.S. PATENT DOCUMENTS

| | | | | |
|---|---|---|---|---|
| 11,415,556 | B2 * | 8/2022 | Lee | G01N 29/2487 |
| 11,557,271 | B2 * | 1/2023 | Su | G10K 11/175 |
| 12,211,475 | B2 * | 1/2025 | Sakamoto | G10K 11/172 |
| 2005/0167193 | A1 * | 8/2005 | Van Reeth | E01F 8/0082 181/293 |

OTHER PUBLICATIONS

Long et al. "Multiband quasi-perfect low-frequency sound absorber based on double-channel Mie resonator." Applied Physics Letters 112.3 (2018): 033507.

Lee et al. "Ultrasparse acoustic absorbers enabling fluid flow and visible-light controls." Physical Review Applied 11.2 (2019): 024022.

* cited by examiner

FIG. 1C
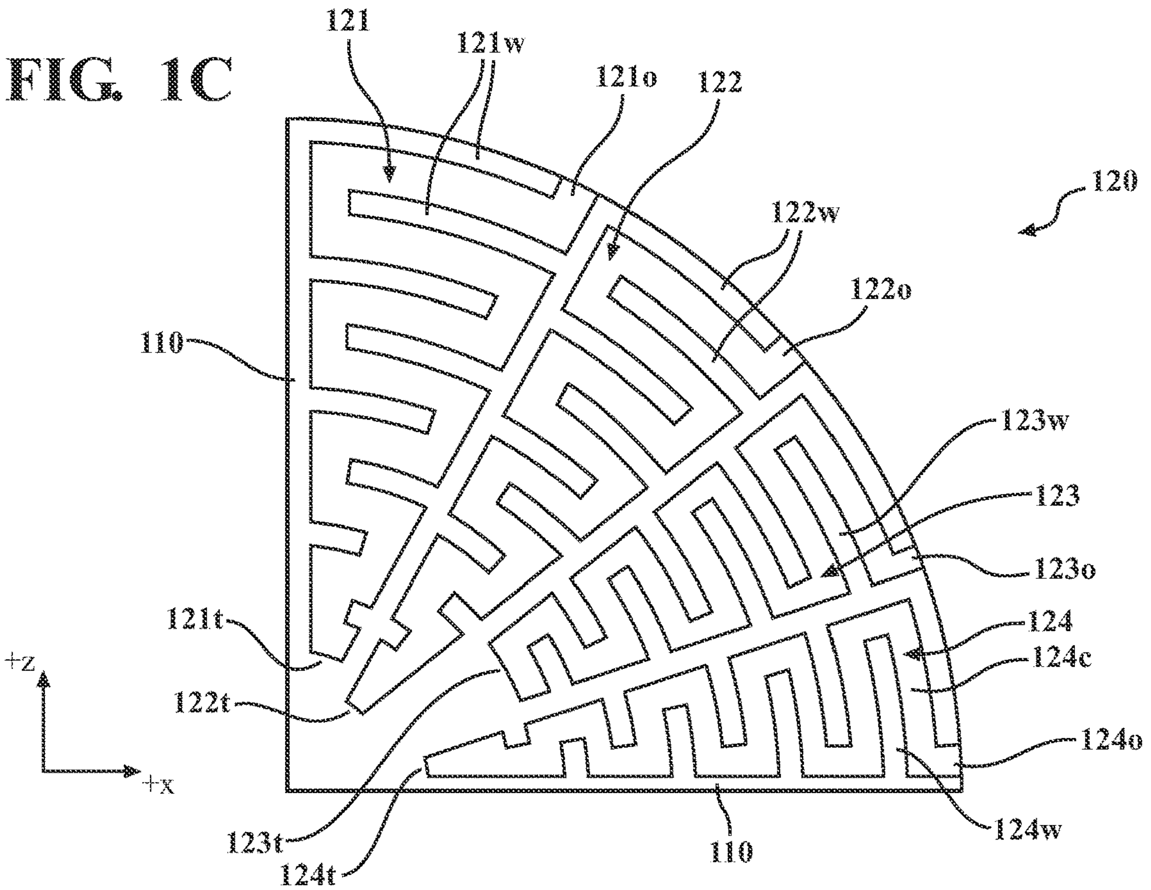
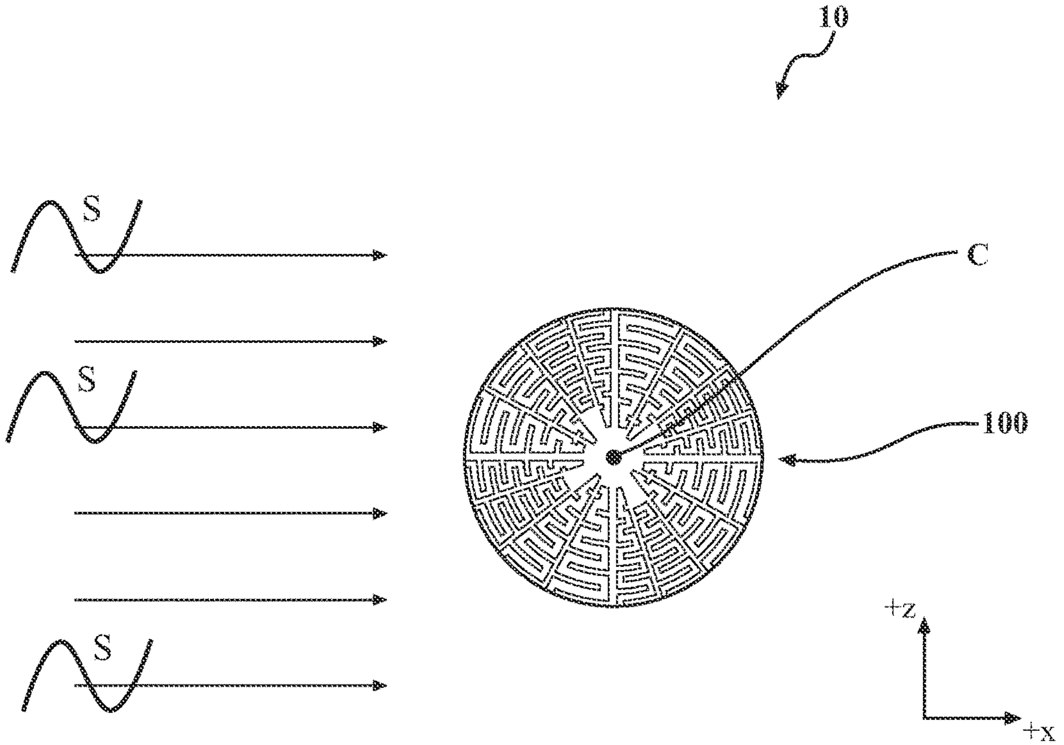
FIG. 2A

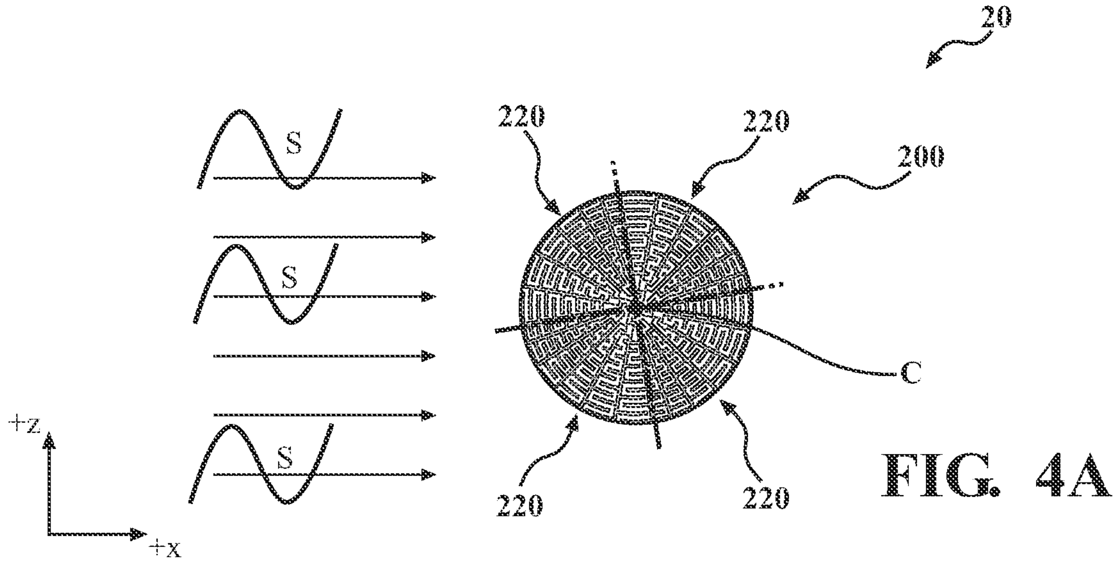
FIG. 4A
FIG. 4B
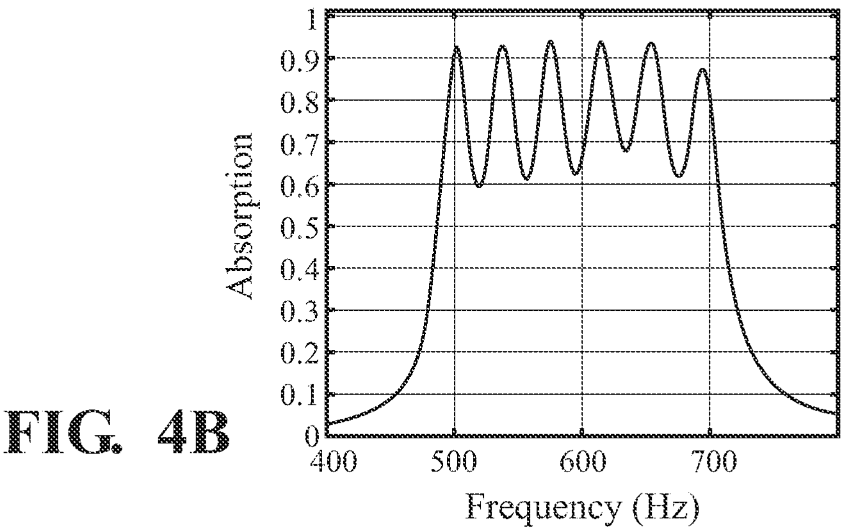
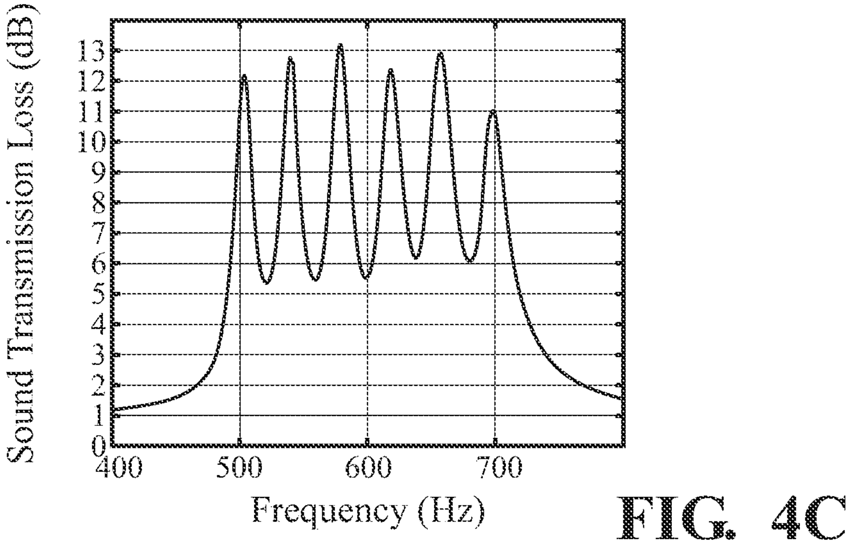
FIG. 4C

ANGLE INDEPENDENT ACOUSTIC STRUCTURES FOR BROADBAND SOUND ABSORPTION AND SOUND TRANSMISSION LOSS

TECHNICAL FIELD

The present disclosure relates to acoustic structures that absorb sound and exhibit sound transmission loss.

BACKGROUND

Noise pollution is an increasingly common issue across multiple environments. For example, low-frequency noise in motor vehicles is an issue related to passenger comfort. Also, sound from motors, large fans, and diesel engines, among other undesirable sounds, contribute to sound annoyance not only in the automotive industry, but also in various facets of daily life.

The present disclosure addresses issues related to sound absorption and improving sound transmission loss for acoustic structures across broad frequency ranges.

SUMMARY

This section provides a general summary of the disclosure and is not a comprehensive disclosure of its full scope or all of its features.

In one form of the present disclosure, an acoustic structure includes an acoustic scatterer enclosed by two cover plates attached on ends of the acoustic scatter. In some variations, the two cover plates are permanently attached to the ends of the acoustic scatterer and in at least one variation one or both of the two cover plates have the same outer circumference as the acoustic scatterer. The acoustic scatterer also includes a plurality of repeating cells having a corresponding plurality of distinct resonant channels such that the acoustic scatterer is an angle independent broadband acoustic absorber.

In another form of the present disclosure, an acoustic structure includes a plurality of acoustic scatterers with each of the plurality of acoustic scatterers each including a plurality of repeating cells with a corresponding plurality of distinct zigzag shaped resonant channels such that the plurality of acoustic scatterers are angle independent broadband acoustic absorbers. In some variations, the acoustic structure includes two cover plates attached to opposing ends of each of the plurality of acoustic scatterers. In addition, the two cover plates can be permanently attached to the ends of the acoustic scatterers and in at least one variation one or both of the respective two cover plates have the same outer circumference as a respective acoustic scatterer to which the two cover plates are attached.

In still another form of the present disclosure, an acoustic structure includes a cylindrical shaped acoustic scatterer with a plurality of repeating cells positioned about a central axis of the cylindrical shaped acoustic scatterer. The plurality of repeating cells each include a plurality of distinct zigzag shaped resonant channels such that the cylindrical shaped acoustic scatterer is an angle independent broadband acoustic absorber. In some variations, the cylindrical acoustic scatterer includes two cover plates attached to ends thereof. In addition, the two cover plates can be permanently attached to the ends of the cylindrical acoustic scatterer and in at least one variation one or both of the respective two cover plates have the same outer circumference as the cylindrical acoustic scatterer.

Further areas of applicability and various methods of enhancing the disclosed technology will become apparent from the description provided herein. The description and specific examples in this summary are intended for illustration only and are not intended to limit the scope of the present disclosure.

BRIEF DESCRIPTION OF THE DRAWINGS

The present teachings will become more fully understood from the detailed description and the accompanying drawings, wherein:

FIG. 1C illustrates an isolated view of a repeating cell shown in FIG. 1B;

FIG. 2A illustrates soundwaves incident on the acoustic scatterer in FIGS. 1A-1C;

FIG. 4A illustrates propagating soundwaves incident on the acoustic scatterer in FIG. 3;

FIG. 4B is a graph illustrating absorption as a function of soundwave frequency for the acoustic scatterer in FIG. 4A;

FIG. 4C is a graph illustrating STL as a function of soundwave frequency for the acoustic scatterer in FIG. 4A;

Figure 1A:
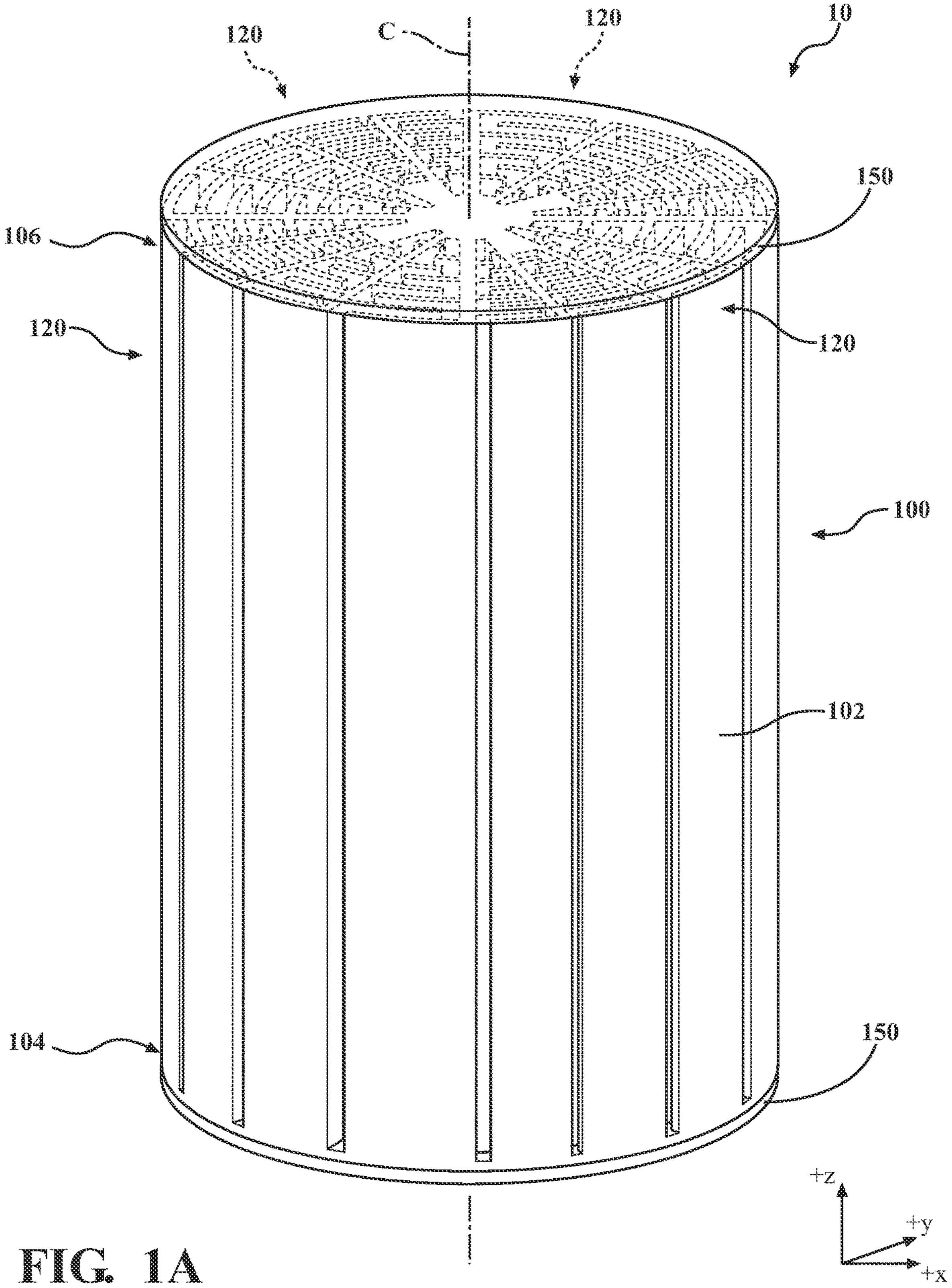
FIG. 1A illustrates a perspective view of an acoustic scatterer with a plurality of repeating cells according to the teachings of the present disclosure.

It should be noted that the figures set forth herein are intended to exemplify the general characteristics of the chemical compounds, materials, and catalysts among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The present disclosure provides a sound absorbing and sound transmission loss structure, also known as an acoustic structure with at least one acoustic scatterer that absorbs soundwaves and increases Sound Transmission Loss (hereinafter STL) of the soundwaves. In addition, acoustic scatterers according to the teachings of the present disclosure function independent of the angle from which soundwaves are incident thereon.

The acoustic scatterer includes two or more resonant channels and each resonant channel has an open end in fluid communication with a closed terminal end (also referred to herein simply as "terminal end"). In some variations, each of the resonant channels are separate from and distinct than the other resonant channels such that each of the resonant channels have a different resonant frequency. As used herein, the term 'distinct" refers to resonant channels that may overlap in size, composition material, and/or shape, but do not have the same resonant frequency, frequency range, frequency absorption range, frequency transmission loss range, and/or resonant frequency range. An example of resonant channels that are not distinct are resonant channels that have different colors, are made from different materials, and/or have different shapes, but have the same resonant frequency. Also, as used herein, the phrase "resonant frequency" refers to the oscillation of a resonant channel at its natural or unforced resonance and the phrase "natural resonance" refers to the frequency at which a resonant channel will oscillate in the absence of any driving force.

In at least one variation, the acoustic structure includes a plurality of repeating cells, and each cell of the repeating cells includes at least two distinct resonant channels configured to absorb and increase STL of at least two distinct frequencies of incident soundwaves. In some variations, each of the distinct resonant channels has a zigzag pattern, for example, a lightning bolt pattern, a linear traveling pattern advancing using acute inner angles, a curved traveling pattern advancing in a concave manner, among others.

In at least one variation, the acoustic structure includes two cover plates attached to opposing ends of the acoustic scatterer. In some variations, the two cover plates are permanently attached to the opposing ends of the acoustic scatterer and one or both of the cover plates can have an outer circumference that is generally equal to an outer circumference of the acoustic scatterer.

In some variations, sound projected towards the acoustic structure is at least partially reflected by one or both cover plates without a phase change and the at least acoustic scatterer behaves like a monopole source at a certain distance from the cover plates and its mirror image radiates a monopole moment as well. The two monopoles form a new plane wave having a direct reflection from the cover plate(s) with 180° phase difference. As such, the wave reflected by the plate is essentially canceled out by the new plane wave, thus absorbing the projected sound.

As mentioned above, the acoustic structures according to the teachings of the present disclosure absorbs soundwaves and/or exhibits STL of the soundwaves independent of the angle from which soundwaves are incident thereon. The angle independent nature of the acoustic scatterer stems from or is the result of the two or more repeating cells oriented at different angles with respect to a central axis, central line and/or central plane of the acoustic scatterer.

Not being bound by theory, for acoustically small objects such as the acoustic structure disclosed herein, background and scattered soundwaves can be decomposed into monopole and dipole components. Materials displaying a monopole response can only absorb the monopole component of the incident wave. The same limitation applies to dipole as well. However, the acoustic scatterers according to the teachings of the present disclosure exhibit monopole and dipole scattering at a similar frequency such that these two components (monopole and dipole) of the incident wave participate in the momentum exchange process and hence become available for absorption. Stated differently, the scattering strength of the monopole and dipole components are the same such that their magnitudes are the same and their scattering has constructive interference in a forward scattering direction and is canceled in a background direction.

In some variations, an angle independent acoustic scatterer (also referred to herein simply as "acoustic scatterer") has an outer cylindrical shape, while in other variations the angle independent acoustic scatterer has a cuboidal, conical, truncated cylindrical, semi-cylindrical, and/or any symmetrical polygonal shape. The benefit of having a cylindrical shape is that soundwaves that are repelled (reflected), instead of being absorbed or transmitted, may be incident upon another physical object or structure that may decrease the audible sound.

The repeating cells within an acoustic scatterer each contain more than one distinct resonant channel. Generally, the repeating cells are positioned about a center or a central axis, central line, and/or central plane of the acoustic scatterer such that each resonant channel is not directly adjacent to its pivoted counterpart in a neighboring cell. However, it is possible to have a repeating cell that is a mirror image of a neighboring cell such that the pattern of resonant channel organization repeats in inverse order.

Referring to FIG. 1A, a perspective view of an angle independent acoustic structure 10 (also referred to herein simply as "acoustic structure") according to one form of the present disclosure is shown. The acoustic structure 10 includes an acoustic scatterer 100 with four (4) repeating cells 120 that are triangular prism shaped and extend between a central axis 'C' and an outer surface 102. As used herein, the phrase "triangular prism shaped" refers to a geometric triangular prism with or without an outer curved surface. That is, the repeating cells 120 shown in FIG. 1A have a triangular prism shape with an outer curved surface 102. However, in at least one variation the repeating cells 120 can have a triangular prism shaped with a linear or planar outer surface 102.

In some variations, the acoustic scatterer 100 includes a first end 104 (e.g., a bottom (−z direction) end) permanently or semi-permanently attached to a cover plate 150. In the alternative, or in addition to, the acoustic scatterer 100 includes a second end 104 (e.g., a top (+z direction) end) permanently or semi-permanently attached to another cover plate 150. Stated differently, in some variations the acoustic structure 10 includes two cover plates 150 attached to opposing ends of the acoustic scatterer 100. As used herein, the phrase "permanently attached" refers to one object being attached to another object such the two objects cannot be separated from each other without damaging or breaking at least one of the objects. And as used herein the phrase "semi-permanently attached" refers to one object being releasably attached to another object such the two objects can be separated from each other without damaging or breaking either object.

Figure 1B:
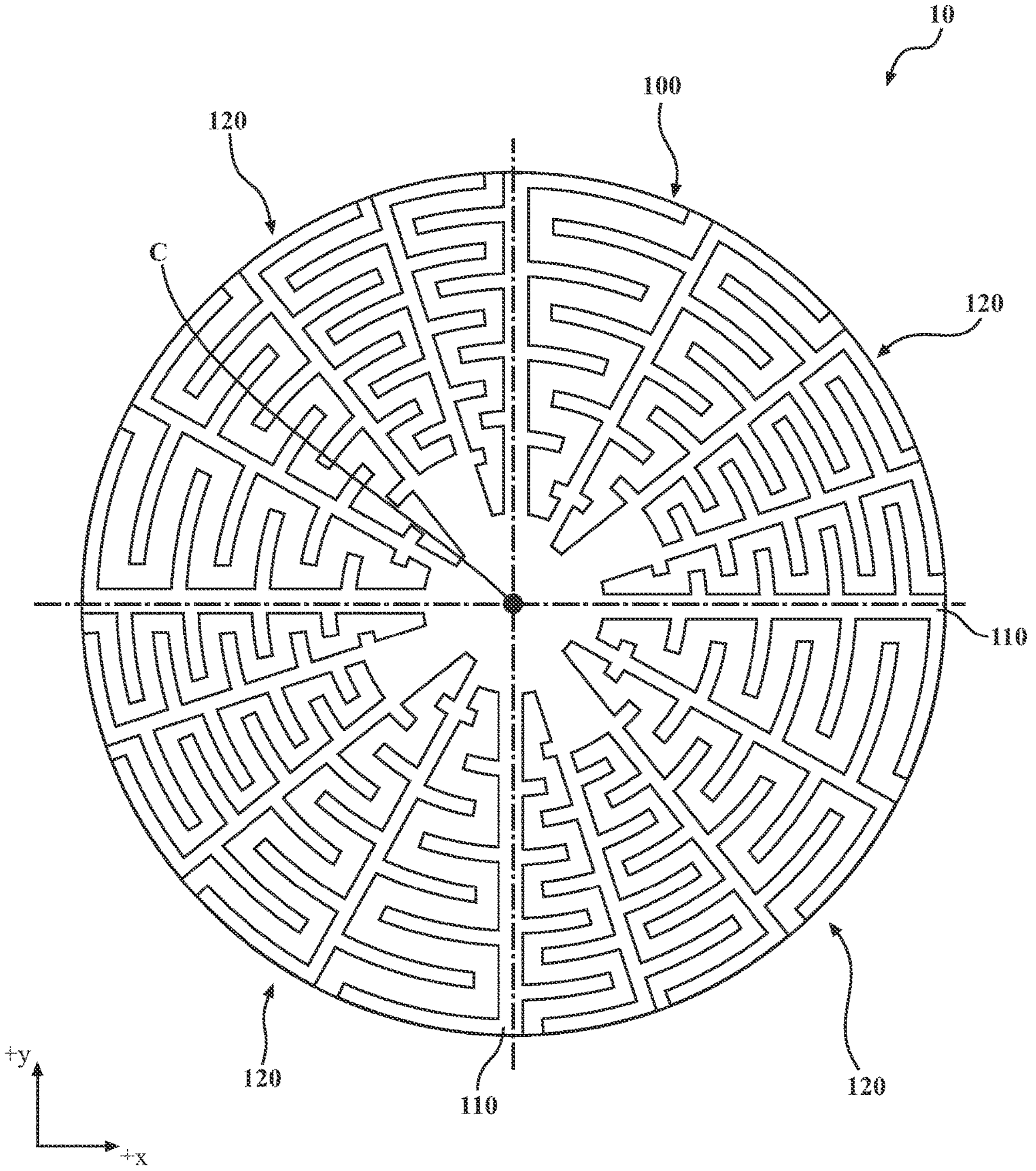
FIG. 1B illustrates a top view of the acoustic scatterer in FIG. 1A.

Referring to FIGS. 1B-1C, a top view (i.e., viewing in the −z direction) of the acoustic structure 10 is shown in FIG. 1B (cover plate 150 not shown) and an isolated top view of one of the repeating cells 120 is shown in FIG. 1C (cover plate 150 not shown). The repeating cells 120 are arranged or oriented about the central axis C of the acoustic scatterer 100 as illustrated in FIG. 1B and each repeating cell 120 includes at least one cell wall 110. That is, each repeating cell 120 is defined between at least one cell wall 110 and the outer surface 102 (FIG. 1A).

Each repeating cell 120 includes a plurality of distinct resonant channels defined or bounded by one or more channel walls. For example, and with reference to FIG. 1C, a repeating cell 120 includes a first resonant channel 121 defined by or extending between channel walls 121*w*, a second resonant channel 122 defined by or extending between channel walls 122*w*, a third resonant channel 123 defined by or extending between channel walls 123*w*, and a fourth resonant channel 124 defined by or extending between channel walls 124*w*. In addition, the first resonant channel 121 has an open end 121*o* and a terminal end 121*t*, the second resonant channel 122 has an open end 122*o* and a terminal end 122*t*, the second resonant channel 123 has an open end 123*o* and a terminal end 123*t*, and the fourth resonant channel 124 has an open end 124*o* and a terminal end 124*t*. Stated differently, each of the resonant channels have an open end and a terminal end.

Still referring to FIG. 1C, each of the resonant channels 121-124 is distinct, i.e., each of the resonant channels 121-14 has a resonant frequency that is different than a resonant frequency of the other resonant channels. For example, each of the resonant channels 121-124 have a distinct length, width between walls, and/or zigzag pattern such that the first resonant channel 121 has a first resonant frequency $f_{o1}$, the second resonant channel 122 has a second resonant frequency $f_{02}$, the third resonant channel 123 has a third resonant frequency $f_{03}$, the fourth resonant channel 124 has a fourth resonant frequency $f_{04}$, and $f_{01} \neq f_{o2} \neq f_{o3} \neq f_{o4}$. In addition, and with the repeating cells 120 positioned or oriented about the central axis C as shown in FIGS. 1A-1B, the acoustic structure 10 absorbs sound and increases STL independent of angles from which soundwaves approach and impact the acoustic scatterer 100.

Figure 2B:
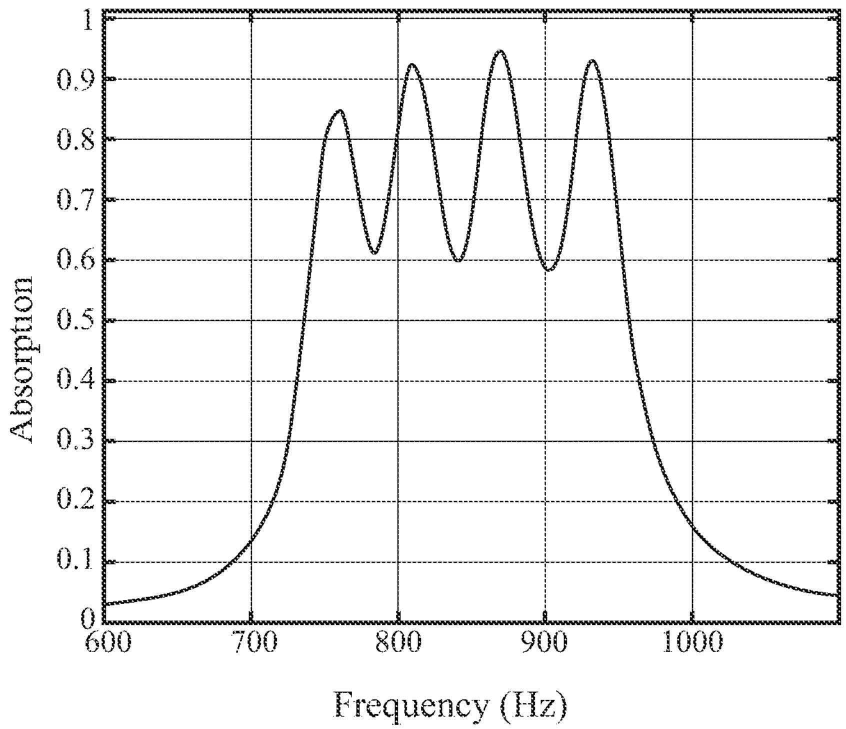
FIG. 2B is a graph illustrating absorption as a function of soundwave frequency for the acoustic scatterer in FIG. 2A.
Figure 2C:
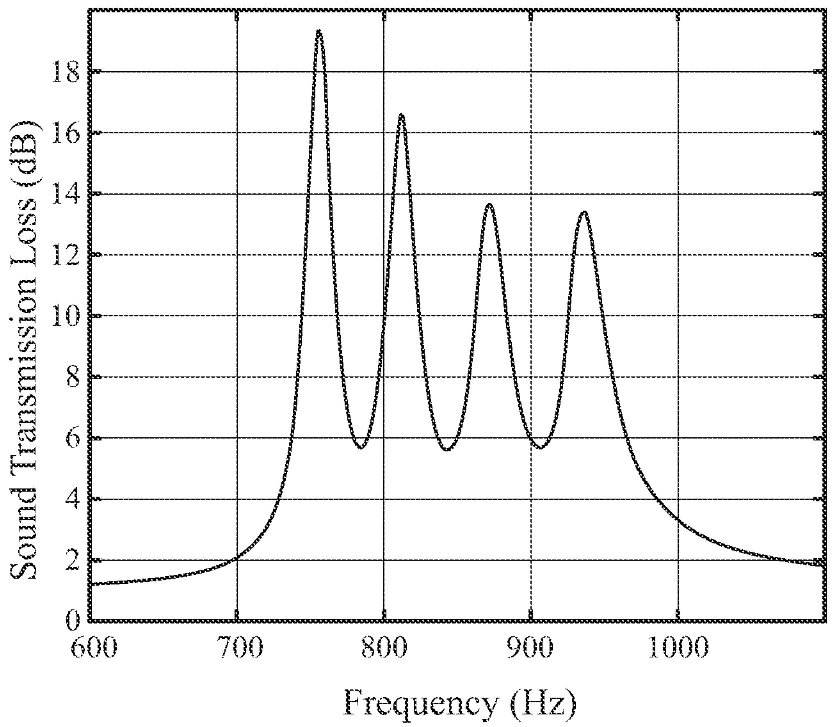
FIG. 2C is a graph illustrating STL as a function of soundwave frequency for the acoustic scatterer in FIG. 2A.

Referring to FIGS. 2A-2C, soundwaves ‘S’ with frequencies between about 600 Hz and about 1100 Hz propagating towards the acoustic structure 10 (cover plate 150 not shown) in the +x direction is shown in FIG. 2A, the simulated absorption of the soundwaves S as a function of frequency by the acoustic structure 10 is shown in FIG. 2B, and the simulated STL of the soundwaves S as a function of frequency by the acoustic structure 10 is shown in FIG. 2C. And as observed from FIG. 2B, the acoustic structure 10 provides broadband absorption of the soundwaves S with an average absorption of about 75% for frequencies between about 750 Hz and about 950 Hz, and even higher absorption at frequencies of about 760 Hz, 810 Hz, 865 Hz, and 925 Hz. In addition, and with reference to FIG. 2C, the acoustic structure 10 provides STL of about 19 dB at about 750 Hz, 16.5 dB at 810 Hz, 13.5 dB at 865 Hz, and 13.5 dB at 925 Hz.

It should be understood that the orientation or positioning of the four repeating cells 120 about the central axis C of the acoustic scatterer 100 provides absorption and increased STL for soundwaves S propagating towards the acoustic structure 10 at different angles relative to the +x axis. That is, with the repeating cells 120 spanning 360° about the central axis C, and each of the repeating cells containing the four resonant channels 121-124, the acoustic scatterer 100 absorbs soundwaves and increases STL for soundwaves propagating towards the acoustic scatterer 100 from any x-z direction shown in the figures.

Figure 3:
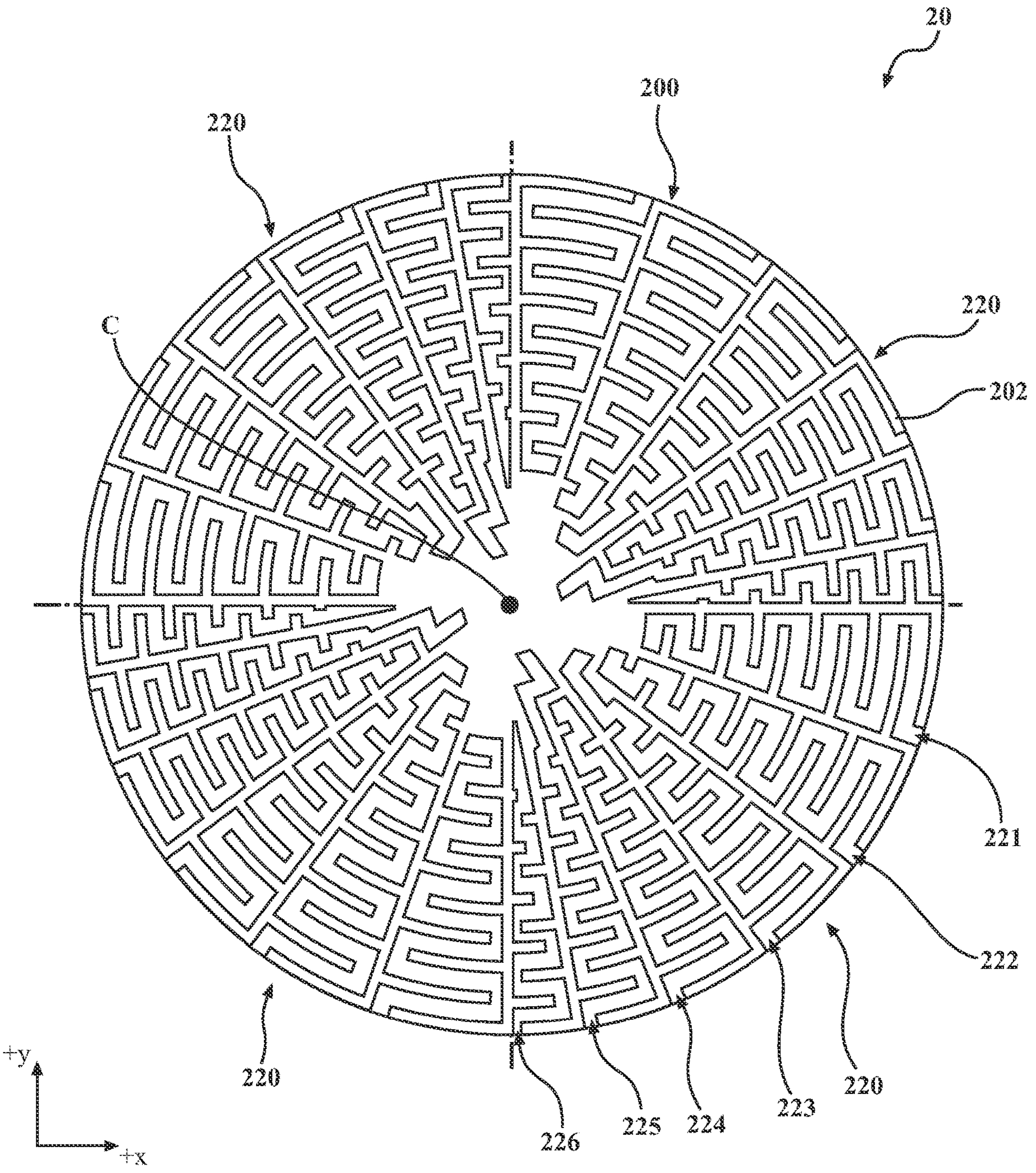
FIG. 3 illustrates a top view of an acoustic scatterer with a six (6) repeating cells according to the teachings of the present disclosure

Referring to FIG. 3, a top view of an acoustic structure 20 according to another form of the present disclosure is shown. The acoustic structure 20 includes an acoustic scatterer 200 with four (4) repeating cells 220 extending between a central axis ‘C’ and an outer surface 202. In some variations, the acoustic scatterer 200 includes one or two cover plates (not shown) permanently or semi-permanently attached to one or both ends of the acoustic scatterer 200. However, and in contrast to the acoustic scatterer 100, each repeating cell 220 of the acoustic scatterer 200 includes six resonant channels 221-226 defined or bounded by one or more channel walls (not labeled). Also, each resonant channel 221-226 has an open end (not labeled) and a terminal end (not labeled).

Each of the resonant channels 221-226 is distinct. For example, each of the resonant channels 221-226 have a length, width between channel walls, and/or zigzag pattern such that the first resonant channel 221 has a first resonant frequency $f_{o1}$, the second resonant channel 222 has a second resonant frequency $f_{02}$, the third resonant channel 223 has a third resonant frequency $f_{03}$. the fourth resonant channel 224 has a fourth resonant frequency $f_{04}$, the fifth resonant channel 225 has a fifth resonant frequency $f_{05}$, the sixth resonant channel 226 has a sixth resonant frequency $f_{05}$, and $f_{o1} \neq f_{o2} \neq f_{o3} \neq f_{o4} \neq f_{o5} \neq f_{o6}$. In addition, and with the repeating cells 220 positioned or oriented about the central axis C as shown in FIG. 3, the acoustic structure 20 absorbs sound and increases STL independent of angles from which soundwaves approach and impact the acoustic scatterer 200.

Referring to FIGS. 4A-4C, soundwaves S with frequencies between about 400 Hz and about 800 Hz propagating towards the acoustic structure 20 (cover plate(s) not shown) in the +x direction is shown in FIG. 4A, the simulated absorption of the soundwaves S as a function of frequency by the acoustic structure 20 is shown in FIG. 4B, and the simulated STL of the soundwaves S as a function of frequency by the acoustic structure 20 is shown in FIG. 4C. And as shown in FIG. 4B, the acoustic scatterer 200 provides broadband absorption of the soundwaves S with an average absorption of about 75% for frequencies between about 490 Hz and about 700 Hz and even higher absorption at the resonant frequencies of about 510 Hz, 540 Hz, 575 Hz, 615 Hz, 650 Hz, and 695 Hz. In addition, and with reference to FIG. 4C, the acoustic structure 20 provides STL of about 12 dB at about 510 Hz, 13 dB at 540 Hz and 575 Hz, 12.5 dB at 615 Hz, 13 dB at 650 Hz, and 11 dB at 695 Hz.

It should be understood that the orientation or positioning of the four repeating cells 220 about the central axis C of the acoustic scatterer 200 provides absorption and increased STL for soundwaves propagating towards the acoustic structure 20 at different angles relative to the +x axis. That is, with the repeating cells 220 spanning 360° about the central axis C, and with each repeating cell 220 containing the six resonant channels 221-226, the acoustic scatterer 200 absorbs soundwaves and increases STL for soundwaves propagating towards the acoustic scatterer 200 from any x-z direction shown in the figures.

Figure 5:
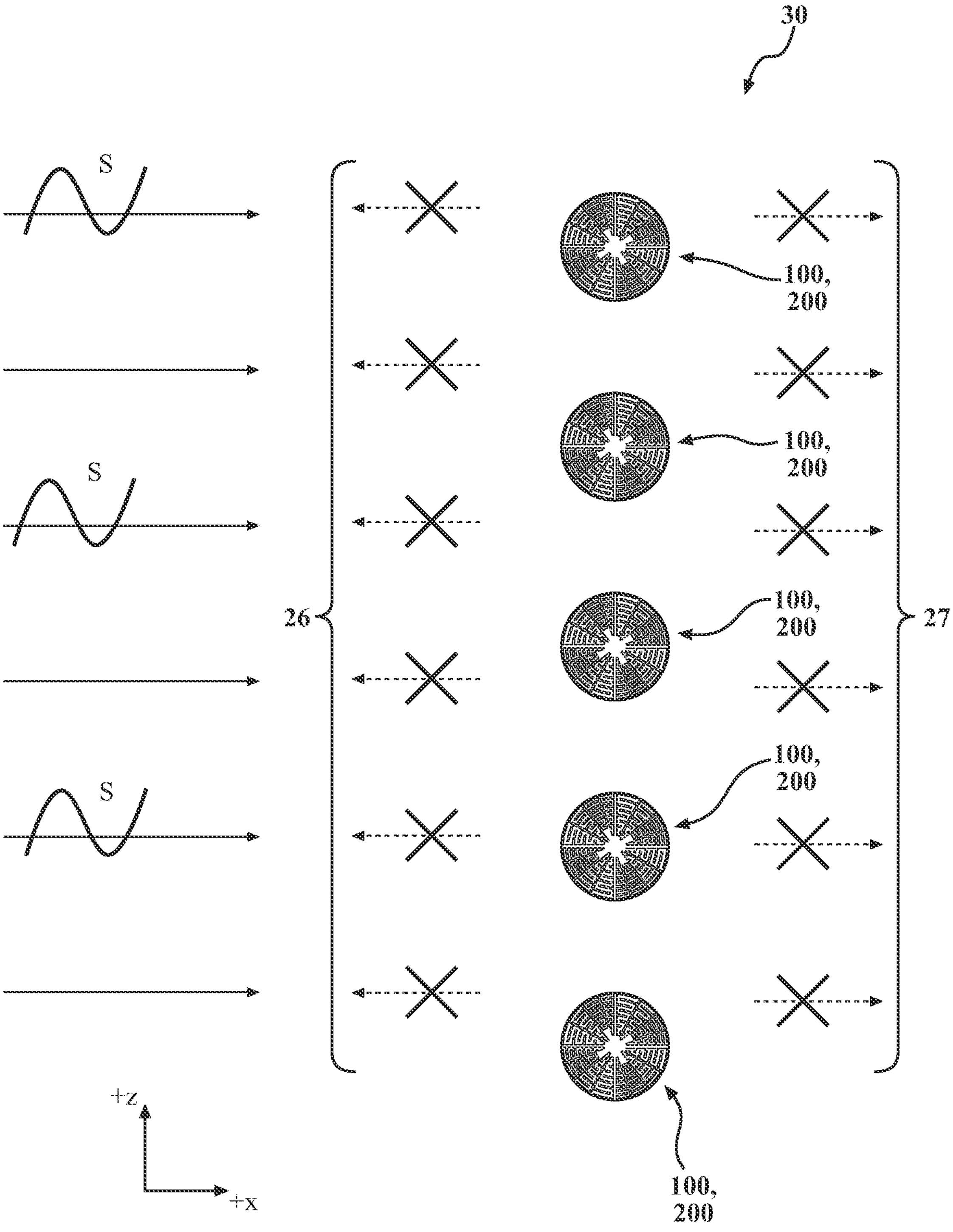
FIG. 5 illustrates propagating soundwaves incident on an acoustic structure with a row or column of acoustic scatterers according to the teachings of the present disclosure.

Referring to FIG. 5, an assembly 30 of a plurality of the acoustic scatterers 100 (cover plates not shown) or a plurality of the acoustic scatterers 200 (cover plates not shown) is shown. In addition, FIG. 5 illustrates soundwaves S with a range of frequencies propagating towards the assembly 30, reflection of soundwaves from the assembly 30 being reduced via absorption (illustrated by the “X’s through the arrows in the section labeled ‘26’) and transmission of the soundwaves through the assembly being reduced via STL (illustrated by the “X’s through the arrows in the section labeled ‘27’). Accordingly, it should be understood that the acoustic scatterers according to the teachings of the present disclosure have a variety of uses such as noise barriers for and/or within infrastructures, silencers for and/or within ventilation systems, and sound absorbers in rooms, among others.

Figure 6A:
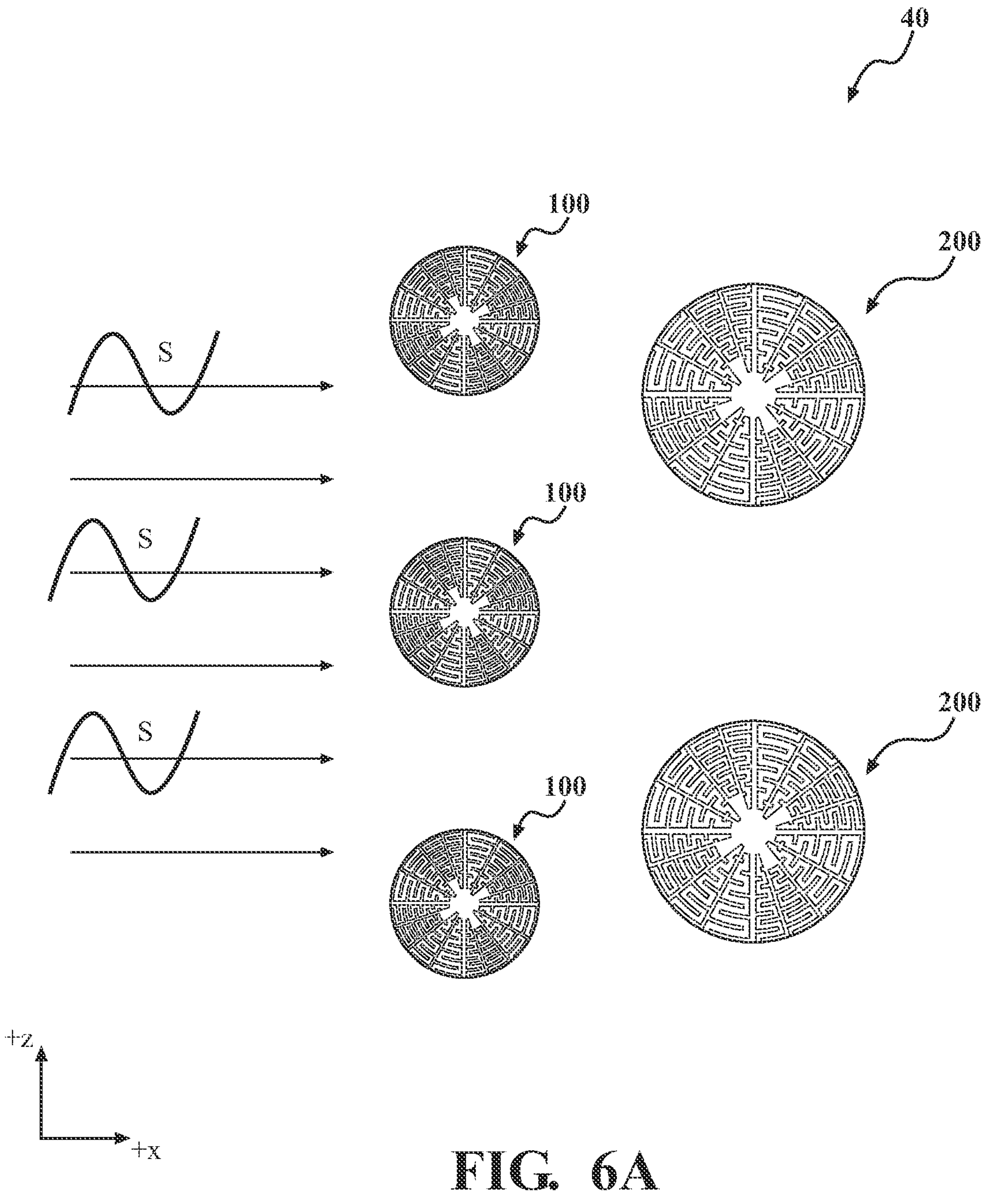
FIG. 6A illustrates propagating soundwaves incident on an acoustic structure having acoustic scatterers with four repeating resonant channels and acoustic scatterers with six repeating resonant channels.
Figure 6B:
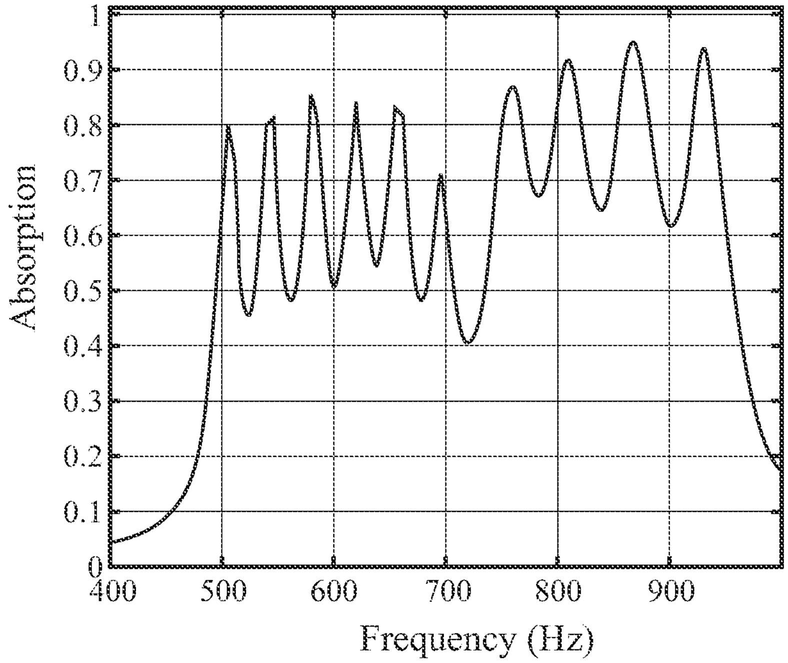
FIG. 6B is a graph illustrating absorption as a function of soundwave frequency for the acoustic structure in FIG. 6A.
Figure 6C:
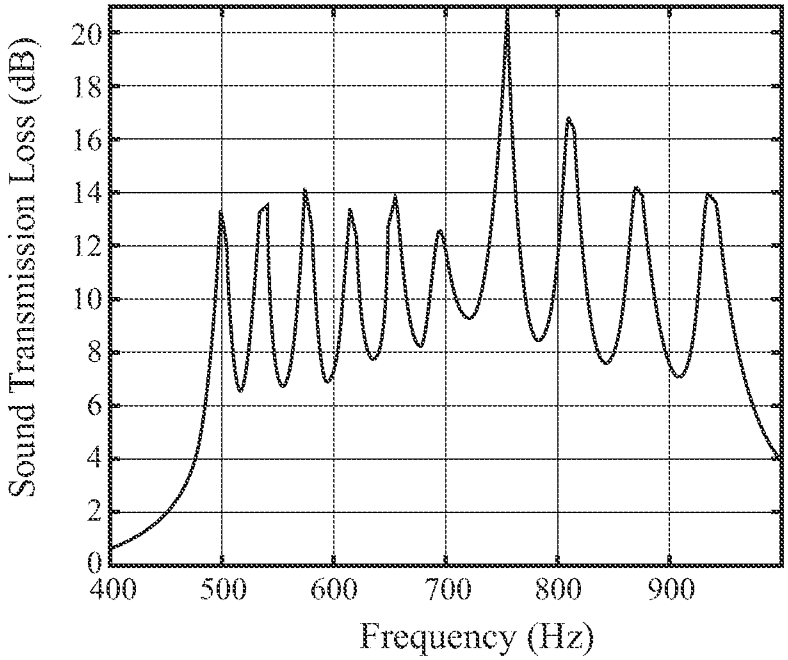
FIG. 6C is a graph illustrating STL as a function of soundwave frequency for the acoustic structure in FIG. 6A.

Referring to FIGS. 6A-6C, soundwaves S with frequencies between about 400 Hz and about 1000 Hz propagating towards an acoustic structure 40 is shown in FIG. 6A, the simulated absorption of the soundwaves as a function of frequency by the acoustic structure 40 is shown in FIG. 6B, and the simulated STL of the soundwaves as a function of frequency by the acoustic structure 40 is shown in FIG. 6C. The acoustic structure 40 includes three acoustic scatterers 100 (cover plates not shown) and two acoustic scatterers 200 (cover plates not shown). And as observed from FIGS. 6B-6C, the acoustic structure 40 combines the absorption and STL of the acoustic scatterers 100 and the acoustic scatterers 200. Particularly, the acoustic structure 40 provides broadband absorption of the soundwaves with an average absorption of about 75% for frequencies between about 490 Hz and about 950 Hz, and even higher absorption at the resonant frequencies of about 510 Hz, 540 Hz, 575 Hz, 615 Hz, 650 Hz, 695 Hz, 760 Hz, 810 Hz, 865 Hz, and 925 Hz. In addition, and with reference to FIG. 6C, the acoustic structure 40 provides an increase in STL at the resonance frequencies of about 510 Hz, 540 Hz, 575 Hz, 615 Hz, 650 Hz, 695 Hz, 760 Hz, 810 Hz, 865 Hz, and 925 Hz. Accordingly, the acoustic structure 40 provides broadband absorption of more than about 75% of soundwaves within a first frequency range and more than about 75% of soundwaves within a second frequency range that is different than the first frequency range. And in some variations, the first frequency range and the second frequency range do not overlap with each other.

It should be understood that the orientation or positioning of the four repeating cells 120 (FIG. 1B) about the central axis C of the acoustic scatterer 100 and the four repeating cells 220 (FIG. 3) about the central axis C of the acoustic scatterer 200 provides absorption and increased STL for soundwaves propagating towards the acoustic structure 40 at different angles relative to the +x axis. That is, with the repeating cells 120 and the repeating cells 220 spanning 360° about the respective central axis C, the acoustic structure 40 absorbs soundwaves and increases STL for soundwaves propagating towards the acoustic structure from any x-z direction shown in the figures.

Figure 7:
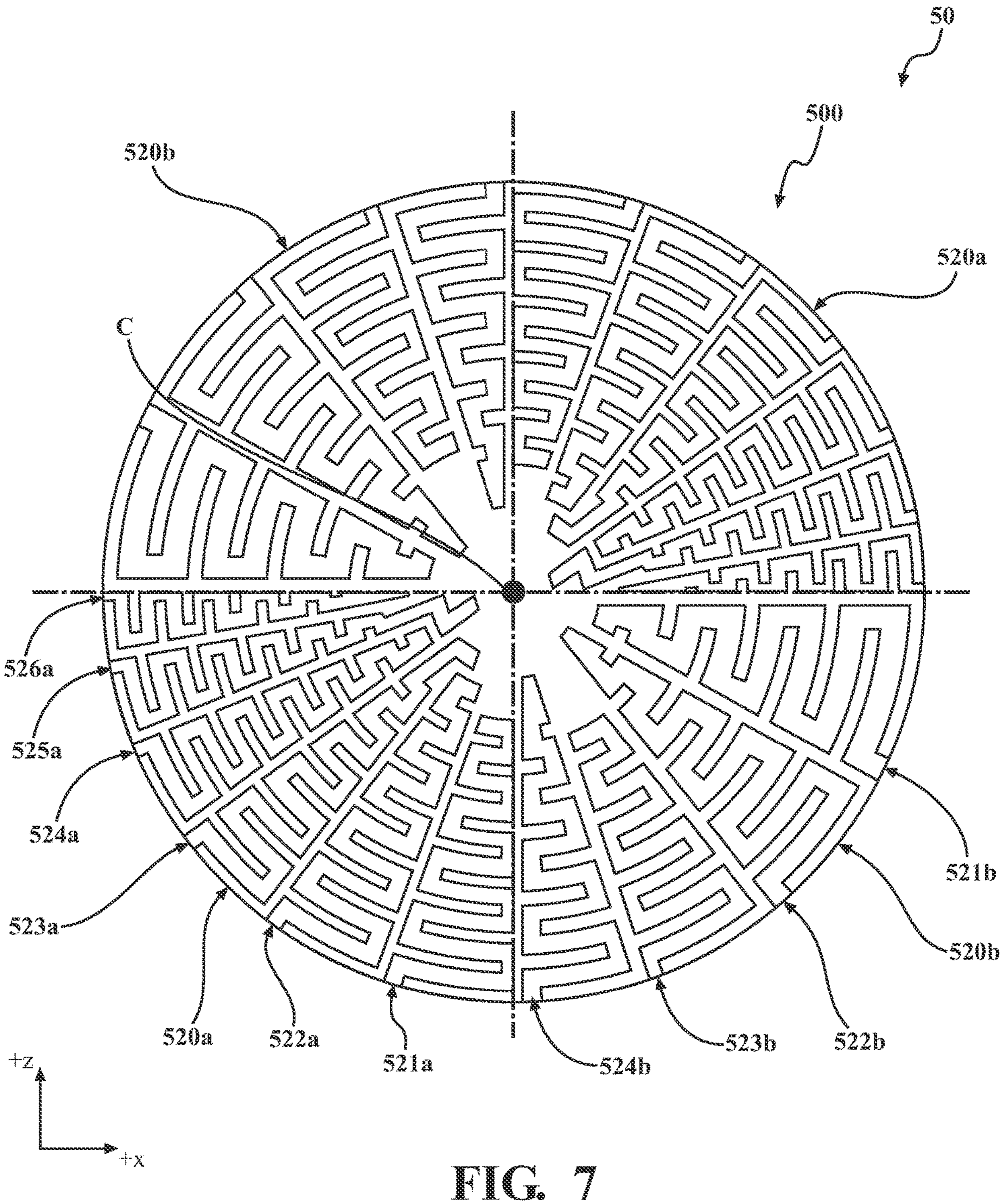
FIG. 7 illustrates an acoustic structure with two different repeating resonant channels.

While the acoustic structures 10, 20, and 40 illustrate acoustics scatterers with identical repeating cells, i.e., each repeating cell has the same set of distinct resonant channels, in some variations an acoustic structure according to the teachings of the present disclosure includes non-identical repeating cells. For example, and with reference to FIG. 7, an acoustic structure 50 includes an acoustic scatterer 500 (cover plates not shown), and the acoustic scatterer 500 includes two identical repeating cells 520*a* with six distinct resonant channels 521*a*-526*a* and two identical repeating cells 520*b* with four distinct resonant channels 521*b*-524*b*. In addition, the six distinct resonant channels 521*a*-526*a* have resonant frequencies of $f_{1a} \neq f_{2a} \neq f_{3a} \neq f_{4a} \neq f_{5a} \neq f_{6a}$, the four distinct resonant channels 521*b*-524*b* have resonant frequencies of $f_{1b} \neq f_{2b} \neq f_{3b} \neq f_{4b}$, and $f_{1a} \neq f_{2a} \neq f_{3a} \neq f_{4a} \neq f_{5a} \neq f_{6a} \neq f_{1b} \neq f_{2b} \neq f_{3b} \neq f_{4b}$. Accordingly, the repeating cells 520*a* are distinct from the two identical repeating cells 520*b*. It should be understood that the two identical repeating cells 520*a* exhibit absorption and increased STL of impinging soundwaves having frequencies corresponding to the resonant frequencies of the six distinct resonant channels 521*a*-526*a* and the two identical repeating cells 520*b* exhibit absorption and increased STL of impinging soundwaves having frequencies corresponding to the resonant frequencies of the four distinct resonant channels 521*b*-526*b*.

It should be understood that variations in the types of scatterers used, the arrangement, and spacing within an acoustic structure may produce varied levels of sound absorption and transmission loss. In addition, varying the size of acoustic scatterers within acoustic structures containing multiple scatterers may improve the aggregate frequencies absorbed and improve transmission loss more than acoustic structures containing a single sized acoustic scatterer because the aggregate resonant frequencies are broader when multiple sized scatterers are present in a structure than when identically sized acoustic scatterers are present. Moreover, varying the arrangement and spacing between acoustic scatterers within an acoustic structure may alter the sound absorbed and STL of the structure.

Each acoustic structure may vary in its arrangement and angle independent acoustic structures may or may not be arranged in a manner that maximizes the absorption and transmission loss of undesirable sounds. Nonetheless, particularly where a sound originates from a single direction it may be economically beneficial to use both angle dependent acoustic scatterers and the angle independent acoustic scatterers together in the same acoustic structures. Angle independent acoustic scatterers, as disclosed herein, have at least two distinct resonant channels within repeated cells while angle dependent acoustic scatterers do not require such intricacies.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "include", "includes", and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms and variations. Therefore, while this disclosure includes particular examples, the true scope of the disclosure should not be so limited since other modifications will become apparent to the skilled practitioner upon a study of the specification and the following claims. Reference herein to one form or variation, or various forms or variations means that a particular feature, structure, or characteristic described in connection with a form, variation, or particular system is included in at least one form or variation. The appearances of the phrase "in one form" (or variations thereof) are not necessarily referring to the same form.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

The invention claimed is:

1. An acoustic structure comprising:

an acoustic scatterer comprising a plurality of triangular prism shaped repeating cells with a corresponding plurality of distinct resonant channels positioned about a central axis of the acoustic scatterer such that the acoustic scatterer is an angle independent broadband acoustic absorber.

2. The acoustic structure according to claim 1, wherein the plurality of triangular prism shaped repeating cells are positioned about a central plane of the acoustic scatterer.

3. The acoustic structure according to claim 1 further comprising a cover plate attached to an end of the acoustic scatterer.

4. The acoustic structure according to claim 3 further comprising another cover plate attached to another end of the acoustic scatterer.

5. The acoustic structure according to claim 1 further comprising a first cover plate attached to a first end of the acoustic scatterer and a second cover plate attached a second opposing end of the acoustic scatterer.

6. The acoustic structure according to claim 1, wherein the plurality of triangular prism shaped repeating cells is four triangular prism shaped repeating cells.

7. The acoustic structure according to claim 1, wherein the plurality of triangular prism shaped repeating cells are identical triangular prism shaped repeating cells.

8. The acoustic structure according to claim 1, wherein the plurality of triangular prism shaped repeating cells comprises a first set of triangular prism shaped repeating cells and a second set of triangular prism shaped repeating cells that are not identical to the first set of triangular prism shaped repeating cells.

9. The acoustic structure according to claim 1, wherein the acoustic scatterer is a plurality of acoustic scatterers.

10. The acoustic structure according to claim 9, wherein the plurality of acoustic scatterers comprises a first set of acoustic scatterers and a second set of acoustic scatterers that are different than the first set of acoustic scatterers.

11. The acoustic structure according to claim 10, wherein the first set of acoustic scatterers absorb more than 75% of soundwaves within a first frequency range and the second set of acoustic scatterers absorb more than 75% of sound waves within a second frequency range that is different than within the first frequency range.

12. An acoustic structure comprising:

a plurality of acoustic scatterers each comprising a plurality of triangular prism shaped repeating cells with a corresponding plurality of distinct resonant channels such that the plurality of acoustic scatterers are angle independent broadband acoustic absorbers.

13. The acoustic structure according to claim 12, wherein the plurality of triangular prism shaped repeating cells are positioned about a central axis of a corresponding acoustic scatterer.

14. The acoustic structure according to claim 13 further comprising two cover plates attached to opposing ends of each of the plurality of acoustic scatterers.

15. An acoustic structure comprising:

a cylindrical shaped acoustic scatterer; and two cover plates attached to opposing ends of the cylindrical shaped acoustic scatterer, the cylindrical shaped acoustic scatterer comprising a plurality of triangular prism shaped repeating cells positioned about a central axis of the cylindrical shaped acoustic scatterer such that the cylindrical shaped acoustic scatterer is an angle independent broadband acoustic absorber.

16. The acoustic structure according to claim 15, wherein the plurality of triangular prism shaped repeating cells comprises a first set of triangular prism shaped repeating cells and a second set of triangular prism shaped repeating cells that are not identical to the first set of triangular prism shaped repeating cells.

* * * * *